United States Patent [19]

Flüeler

[11] Patent Number: 5,787,934

[45] Date of Patent: Aug. 4, 1998

[54] METHOD OF PREVENTING A FAST PROPAGATION OF CRACKS AT PLASTIC TUBES AND PLASTIC TUBES PRODUCED IN ACCORDANCE WITH SUCH METHOD

[75] Inventor: Peter Flüeler, Aathal, Switzerland

[73] Assignee: EMPA Eidgenössische Materialprüfungs- und Forschung-Sanstalt, Dübendorf, Switzerland

[21] Appl. No.: 490,994

[22] Filed: Jun. 15, 1995

[30] Foreign Application Priority Data

Jun. 16, 1994 [CH] Switzerland ............... 1904/94

[51] Int. Cl.⁶ ........................................... F16L 9/00
[52] U.S. Cl. ........................ 138/172; 138/174; 138/178
[58] Field of Search ........................ 138/172, 174, 138/175, 176, 155, 140, 147, 177, 178

[56] References Cited

U.S. PATENT DOCUMENTS

| | | | |
|---|---|---|---|
| 3,825,036 | 7/1974 | Stent | 138/174 |
| 4,176,691 | 12/1979 | Jude et al. | 138/172 X |
| 4,284,107 | 8/1981 | Grose | 138/155 X |
| 4,606,378 | 8/1986 | Meyer | 138/174 X |
| 4,644,975 | 2/1987 | Fricker | 138/172 X |
| 5,236,018 | 8/1993 | Kobayashi et al. | 138/174 X |

*Primary Examiner*—Patrick F. Brinson
*Attorney, Agent, or Firm*—Breiner & Breiner

[57] ABSTRACT

The method for preventing the propagation of cracks in plastic pipes consists substantially in that at predetermined locations of the tube sections of reduced diameter are foreseen, but to provide these sections with a view of reinstating the static strength simultaneously with a reinforcement which does not form a homogeneous compound with the material of the tube. This is made preferably by application of a correspondingly designed crack stopping element between to tube ends or by inserting such a element between same.

3 Claims, 2 Drawing Sheets

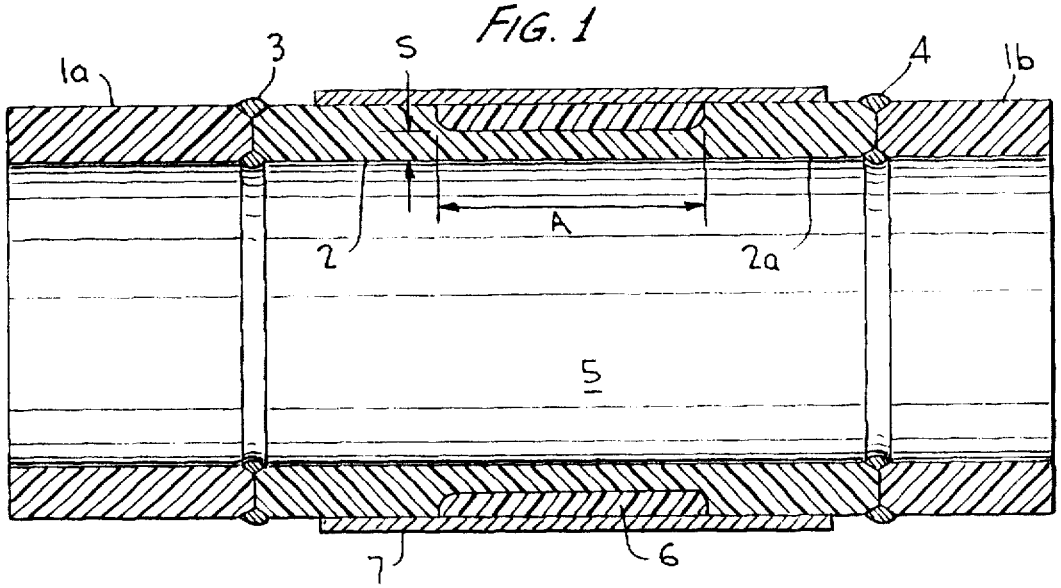
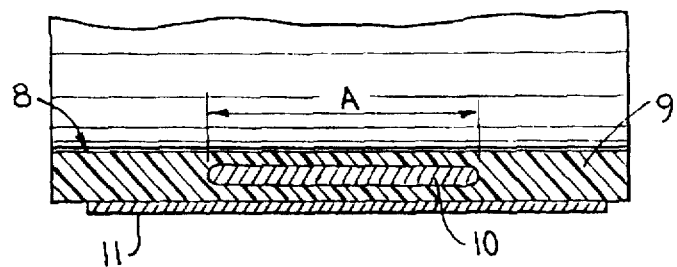
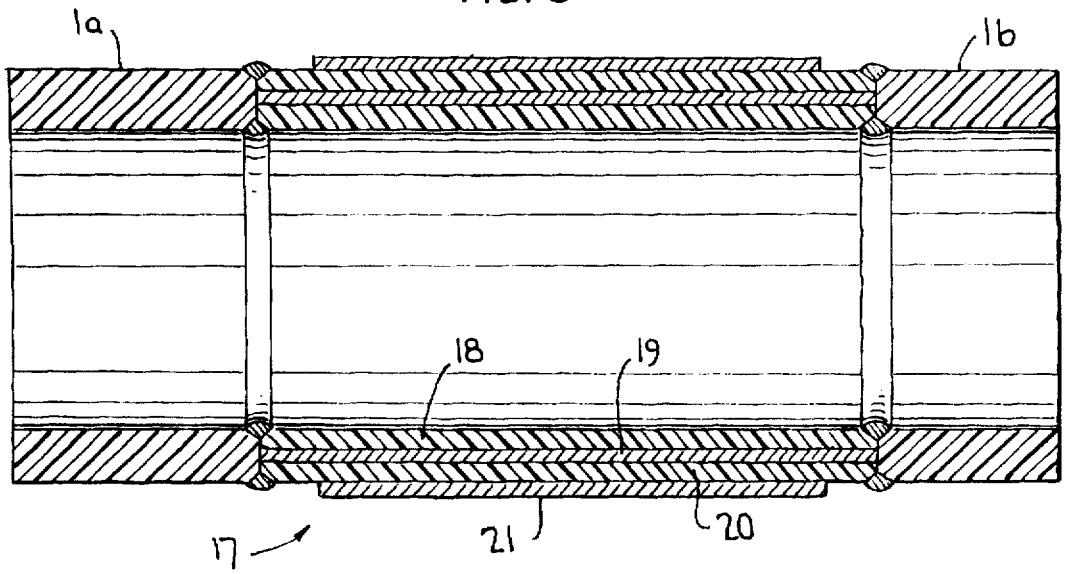

5,787,934

METHOD OF PREVENTING A FAST PROPAGATION OF CRACKS AT PLASTIC TUBES AND PLASTIC TUBES PRODUCED IN ACCORDANCE WITH SUCH METHOD

BACKGROUND OF THE INVENTION

1. Field of the Invention

The present invention relates to a method of preventing a fast propagation of cracks in plastic tubes and to a plastic tube produced in accordance with such method having a means for a prevention of a fast propagation of cracks.

2. Description of the Prior Art

The problems regarding the forming of cracks and specifically regarding the fast propagation of cracks in plastic tubes, specifically pressure tubes (gas or liquid) are known, although plastic tubes, due to their excellent properties, have been successful in all areas of applications. Plastic tubes are presently widely used in gas and water conduit systems because they do not corrode, are of a small weight and can be easily connected to each other or separated from each other. With regard to the static loading (inside pressure) the tubes are sufficiently dimensioned regarding their wall thickness, wherewith the static behavior regarding cracking is sufficiently taken into consideration.

This does, however, not change the fact that at these tubes under certain conditions a fast propagation of cracks is observed (axially extending forming of cracks), depending from the inner pressure, temperature, raw material, dimensions of the tube, conditions of mounting, etc., whereby the prevailing inner pressure forms obviously the main parameter.

In these days efforts are made to cope with the problem by new materials (change of the structure of the molecules of the polymerics and their mixtures), however without reaching effective results therewith.

At the other side it has been observed that certain wall thicknesses exist for plastic tubes which can cause either a propagation of cracks or a stopping of cracks. It appears that in case of a tube having a wall thickness which is lower than the threshold value a crack will come to a standstill, but not at a larger wall thickness.

SUMMARY OF THE INVENTION

It is, therefore a general object of the present invention to provide a method of preventing a fast propagation of cracks in tubes by reducing portions of the wall thickness thereof and reinforcing the thus reduced portions.

A further object is to provide a tube having sections of reduced wall thickness which sections are reinforced to prevent a fast propagation of cracks.

Yet a further object of the present invention is to provide a method of preventing a fast propagation of cracks at plastic tubes, including in consideration of its dynamic behavior a reducing of the wall thickness of the tube designed for static requirements along a predetermined length thereof at predetermined sections of the length of the tube wall and providing the sections of the tube wall which in this manner have been reduced regarding the wall thickness in consideration of reinstating of the static strength with corresponding reinforcements of the circumference, which reinforcements are not at all or only partly interconnected with the base material of the tube.

Still a further object of the invention is to provide a plastic tube having a means for preventing a fast propagation of cracks, of which the tube wall which is designed for static requirements is reduced along predetermined lengths in consideration of the dynamic behavior, the tube having, however, at the areas which are reduced regarding the wall thickness, in consideration of static loadings a reinforcement extending along its circumference.

Due to the proceedings in accordance with the invention it thus is possible to get the problem of the propagation of cracks under control by a reducing of the active wall thickness of the tube and the prerequisite static strength is reestablished by a contradictory simultaneous reinforcing of the weakened area. Preferably, the inventive procedure is accomplished by inserting separate relatively short tube pieces into the tube to be prepared or by a corresponding working of the existing tube.

BRIEF DESCRIPTION OF THE DRAWINGS

The present invention will be better understood and objects other than those set forth above, will become apparent when attention is gives to the following detailed description thereof when read in conjunction with the appended drawings, in which:

FIG. 1 is a longitudinal section through a plastic tube having a crack stopping element set thereinto;

FIG. 2 is a cut-out of a modification of a crack stopping element for the use in a tube according to FIG. 1;

FIG. 3 is a view of a further embodiment having a multi-layer crack stopping element;

DETAILED DESCRIPTION OF THE PREFERRED EMBODIMENTS

Figure 4:
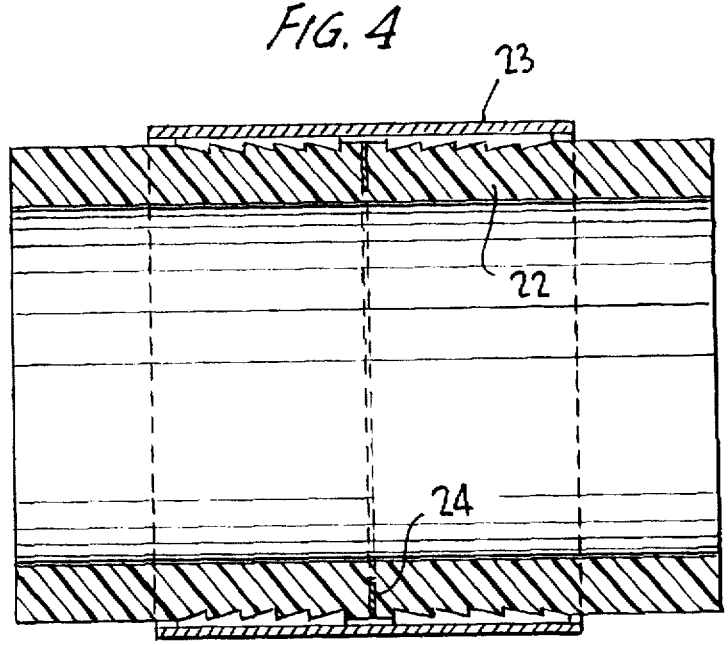
FIG. 4 illustrates a plastic tube with a crack stopping member designed as a radial disk.

How a plastic tube, pipe or hose, resp. can be equipped in order to prevent a rapid propagation of a crack is illustrated by the longitudinal section through a tube in accordance with FIG. 1:

A so called crack stopping element 2 is inserted into a cut apart tube 1a,1b or in-between two tubes 1a,1b, resp., whereby its base body 2a consists also of a plastic material (material same as or different from the material of tube 1a,1b). The tube portions 1a,1b and the base body 2a are welded together at the joint abutments 3,4 and form thus a homogeneous compound structure.

In order now to inhibit the propagation of possible longitudinal cracks or ruptures, resp. the crack stopping element 2 comprises at its center section A reduced wall thickness s, which brings along regarding the formation of cracks the above mentioned effect. The length of the section A results from the selected material and the longitudinal force which is to be anchored. The reduction of the wall thickness was accomplished at the illustrated embodiment by a circumferential groove 2 extending in the outer wall of the crack stopper 2, which groove 2 is filled by a material which will not form a complete compound structure or bond, resp. with the material of the tube, e.g. by a jacket ring 6 consisting of an elastomeric.

Because the tube is weakened at the section A because of the reduced wall thickness in spite of the jacket ring 6, the inner part of the crack stopper 2 is additionally reinforced by a ring or sleeve 7, resp. of steel or a plastic material and features therewith anew a static strength corresponding to the not reduced tube portions.

The propagation of ruptures can be prevented by of the illustrated structure without weakening the static strength of the tube.

FIG. 2 of the drawings illustrates a cut-out of a crack stopping element 8 at which the wall thickness of the base body 9 is reduced by a ring 10 of the same or a different material embedded therein. A supporting ring 11 is foreseen at this embodiment, too.

The longitudinal section of a tube according to FIG. 3 illustrates a further embodiment. Also here the tube 1a,1b which is equipped to prevent a propagation of cracks is provided by a crack stopping element 17 which is composed of three separate layers 18,19,20 of a plastic material. The layers display maximally a reduced connection among each other such that also here a reduced wall thickness in respect to a propagation of cracks exists.

Also this crack stopping element 17 is supported by a ring 21 of steel or e.g. GFK (glass fiber reinforced plastic material). A propagation of cracks through the crack stopping element 17 is not possible due to its reduced active wall thickness.

The crack stopping elements can obviously be foreseen repeatedly at desired distances from each other in the tube such to protect an arbitrarily long tube against a propagation of cracks.

Obviously, the entire tube can be designed in a multilayer fashion in order to prevent the propagation of cracks.

FIG. 4 illustrates a specifically interesting embodiment, in which the wall thickness of the tube 22 is surrounded by a sleeve 23 which is foldable or can be closed, resp. over the tube 22, from which sleeve a ring 24 projects radially inwards and penetrates into the wall of the tube (e.g. by heating) and accordingly reduces considerably the wall thickness of the tube at this area which again serves as a prevention of the forming of cracks.

The jacket or sleeve 23, resp. which can be folded over the tube 22 and be closed around it and which can be arrested in the closed state (after the penetrating of the ring 24) is additionally anchored in the longitudinal direction to the tube 22 by sort of a inner toothing. The sleeve 23 acts, however, primarily as reinforcement of the area of the tube 22 which has been weakened by the penetration of the ring 24 into the wall of the tube.

Figure 5:
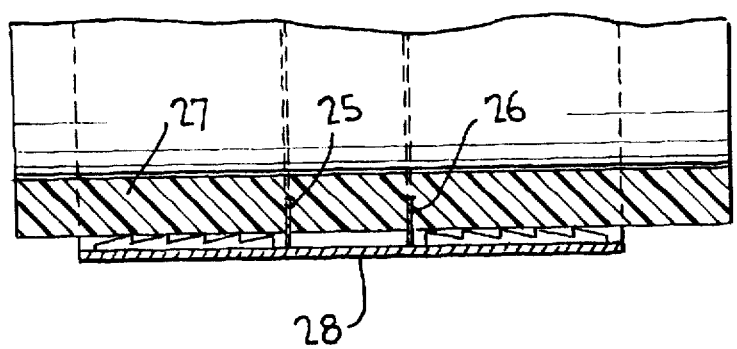
FIG. 5 illustrates a modification of the embodiment according to FIG. 4 with a crack stopping member formed of two disks.

FIG. 5 illustrates a modification of the structure according to FIG. 4 at which two radial rings 25,26 located at a distance from each other at the inner side of a foldable sleeve penetrate into the wall of the tube 27.

Obviously, the modifications of the embodiments in accordance with FIG. 4 and 5 can be embedded directly into a tube part serving as crack stopper instead directly into a plastic tube. Such a crack stopping element would again have to be welded in-between two ends of tubes.

While there are shown and described present preferred embodiments of the invention it shall be distinctly understood that the invention is not limited thereto but may be variously embodied and practiced within the scope of the following claims.

I claim:

1. A method of preventing fast propagation of cracks in a wall of plastic tubes comprising providing in at least one predetermined portion of a length of wall of a plastic tube having a wall thickness substantially dimensioned in accordance with static requirements, a wall section with reduced wall thickness along a circumference of said at least one predetermined portion of said plastic tube; and reinforcing said wall section with reduced wall thickness in each of said at least one predetermined portion of the wall of said plastic tube with a reinforcement member which surrounds each of said at least one predetermined portion of the wall of the plastic tube but which does not become integral with plastic forming said at least one predetermined portion of the wall of said plastic tube.

2. The method of claim 1 wherein each plastic tube having said at least one predetermined portion provided with the wall section with reduced wall thickness is a separate tube inserted between two additional plastic tubes and is connected to each adjacent tube end of said two additional plastic tubes.

3. The method of claim 1 wherein each wall section with reduced wall thickness present in said at least one predetermined portion is formed integral with adjacent wall portions of the plastic tube not having a reduced wall thickness.

* * * * *